(12) United States Patent
Coccia et al.

(10) Patent No.: US 7,879,156 B2
(45) Date of Patent: Feb. 1, 2011

(54) APPARATUS FOR WASHING CIRCUITS INVOLVED IN THE PREPARATION OF MILK-BASED BEVERAGES

(75) Inventors: Andrea Coccia, Binasco (IT); Dario Sala, Binasco (IT)

(73) Assignee: Gruppo Cimbali S.p.A., Binasco (IT)

(*) Notice: Subject to any disclaimer, the term of this patent is extended or adjusted under 35 U.S.C. 154(b) by 394 days.

(21) Appl. No.: 12/174,122

(22) Filed: Jul. 16, 2008

(65) Prior Publication Data

US 2009/0025762 A1  Jan. 29, 2009

(30) Foreign Application Priority Data

Jul. 24, 2007  (EP) .................................. 07425455

(51) Int. Cl.
*B08B 3/10* (2006.01)
(52) U.S. Cl. ............... 134/166 C; 134/168 R; 99/290
(58) Field of Classification Search ............. 134/166 C, 134/168 C, 201; 99/290
See application file for complete search history.

(56) References Cited

U.S. PATENT DOCUMENTS

| | | | |
|---|---|---|---|
| 4,800,805 A * | 1/1989 | Mahlich et al. | 99/293 |
| 5,490,447 A * | 2/1996 | Giuliano | 99/286 |
| 6,959,642 B1 * | 11/2005 | Landolt | 99/455 |
| 7,448,314 B2 * | 11/2008 | Ioannone et al. | 99/452 |
| 7,661,352 B2 * | 2/2010 | Sher et al. | 99/275 |
| 2005/0098575 A1 * | 5/2005 | Carhuff et al. | 221/150 R |
| 2009/0114099 A1 * | 5/2009 | Gotlenboth | 99/288 |

FOREIGN PATENT DOCUMENTS

| | | |
|---|---|---|
| EP | 1656863 | 5/2006 |
| EP | 1797801 | 6/2007 |
| JP | 2006-334086 | * 12/2006 |

OTHER PUBLICATIONS

European Search Report for EP 07425455.8.

* cited by examiner

*Primary Examiner*—Frankie L Stinson
(74) *Attorney, Agent, or Firm*—Nixon & Vanderhye PC

(57) ABSTRACT

Apparatus for washing hydraulic circuits involved in the preparation of milk-based beverages in machines (1) for automatically dispensing hot drinks and/or in machines (1) for preparing and supplying espresso coffee, said circuits comprising at least one first hydraulic path (6) which extends between the milk storage vessel (8, 30) and the delivery device (2), at least one second hydraulic path (7) which extends between a steam source (9) and the same delivery device (2), a source (13) of washing liquid, means (14) for connecting and disconnecting said source (13) of washing liquid to/from a point (16, 26) along the said first hydraulic path (6). The apparatus provides means (21, 22) for connecting the said first hydraulic path (6) to the said second hydraulic path (7), producing a closed recirculating circuit for the washing liquid, as well as valve means (18) for connecting the resultant hydraulic circuit (6, 7, 15) to a discharge outlet (19). In accordance with a preferred embodiment, the apparatus comprises a cartridge (22) having a closed internal cavity (23) provided with first means (6*a*) for connection to the said first hydraulic path (6) as well as second means (7*a*) for connection to said second hydraulic path (7), to be positioned on the machine in place of the beverage delivery unit (2).

7 Claims, 3 Drawing Sheets

APPARATUS FOR WASHING CIRCUITS INVOLVED IN THE PREPARATION OF MILK-BASED BEVERAGES

This application claims priority to European Application No. 07425455.8, filed 24 Jul. 2007, the entire contents of each of which are hereby incorporated by reference.

BACKGROUND OF THE INVENTION

The present invention relates to an apparatus for washing hydraulic circuits involved in the preparation of milk-based beverages in machines for automatically dispensing hot drinks and/or in machines for preparing and supplying espresso coffee, said circuits comprising at least one first hydraulic path which extends between the milk storage vessel and the delivery device, at least one second hydraulic path which extends between a steam source and the same delivery device, a motor-driven pump arranged along said first hydraulic path, valve means situated along said second hydraulic path, a washing liquid source and means for connecting and disconnecting said washing liquid source to/from a point along said first hydraulic path.

As is known, in machines for automatically dispensing hot beverages and in professional automatic machines designed for bars, circuits and specific devices are used for heating and frothing the milk, the latter being in particular intended to form the beverage which is known by the name of "cappuccino".

Such circuits comprise a milk source which may be a refrigerated storage vessel containing fresh milk or an apparatus which produces liquid milk by mixing, inside a special device, cold water with condensed milk drawn from its container by means of a special pump.

The milk, however supplied, is then conveyed by means of a pump to a delivery device which usually also performs the function of heating and forming the froth.

Heating of the milk is usually performed using the heat from condensation of the steam supplied by a special generator via an intercept valve. From the delivery device, the heated and in some cases frothed milk to which, where necessary, coffee is added flows into a cup situated underneath the spouts of the delivery device.

All the paths of the hydraulic circuit affected by the flow of the liquid milk, whether it be fresh or formed by means of dilution of the condensed milk, must be cleaned frequently and regularly and it is advisable for cleaning to be often accompanied also by a disinfecting operation.

The term "cleaning" used below in the present description is understood as meaning therefore washing operations which may be also combined with disinfecting operations and subsequent rinsing operations.

In accordance with the prior art, the circuit sections which are inside the delivery unit are cleaned by separating the said delivery device from the machine and disassembling its component parts. The operation is made easier by the fact that the delivery device is normally connected to the machine by means of a fast-action coupling which also connects both the hydraulic circuit from the milk storage vessel and the circuit from the steam source.

Cleaning of the circuits inside the machine, since they cannot be removed by the operator, is performed by activating processes which cause cleaning liquid to flow inside them.

In accordance with a conventional known cleaning technique, washing of the paths of the circuits inside the machine along which the milk flows provides the connection, by means of a special intercept valve, of these paths to an external source of washing liquid which may be water, to which disinfectant is added if necessary and which may also be hot, being supplied, for example, from the machine boiler. During the washing operation, the liquid is made to flow inside the hydraulic circuits which communicate with the exterior via the spouts of the delivery device. The liquid used is therefore continuously discharged without recycling. Since the action of the cleaning liquid is not immediate, in accordance with the prior art specified above, it is necessary for the liquid to flow for a certain period of time, therefore resulting in a large amount of washing liquid being used.

Moreover, especially in the case where hot or boiling water is used, the flow of this liquid outside the machine may result in the risk of scalding of the operator, should he/she inadvertently place a hand underneath the delivery device.

Examples of such known cleaning technique are described in EP 1,656,863 A1 and in EP 1,797,801 A1.

The object of the present invention is to simplify and automate the cleaning operations in machines of the type mentioned above, reducing the amount of cleaning liquid used and optimising at the same time the flushing efficiency produced by the washing liquid inside the hydraulic circuits undergoing treatment.

SUMMARY OF THE INVENTION

These and other objects, which will appear more clearly from the continuation of the description, are achieved by an apparatus for washing hydraulic circuits involved in the preparation of milk-based beverages in machines for automatically dispensing hot drinks and/or in machines for preparing and supplying espresso coffee provided with a beverage delivery device, a milk source and a steam source, said circuits comprising at least one first hydraulic path which extends between the milk source and the delivery device, at least one second hydraulic path which extends between the steam source and the same delivery device, a motor-driven pump arranged along said first hydraulic path, intercept valve means located along said second hydraulic path, a source of washing liquid, a line between said source of washing liquid and a point located along the said first hydraulic path as well as valve means for intercepting said line, means for connecting the said first hydraulic path to the said second hydraulic path, valve means for connecting the said second hydraulic path to the said line located between said source of washing liquid and said point located along the first path and valve means for connecting the resultant hydraulic circuit to a discharge outlet.

BRIEF DESCRIPTION OF THE DRAWINGS

The characteristic features and advantages of the present invention will emerge more clearly from the following detailed description of some of its practical embodiments illustrated by way of a non-limiting example in the accompanying drawings in which.

Figure 1:
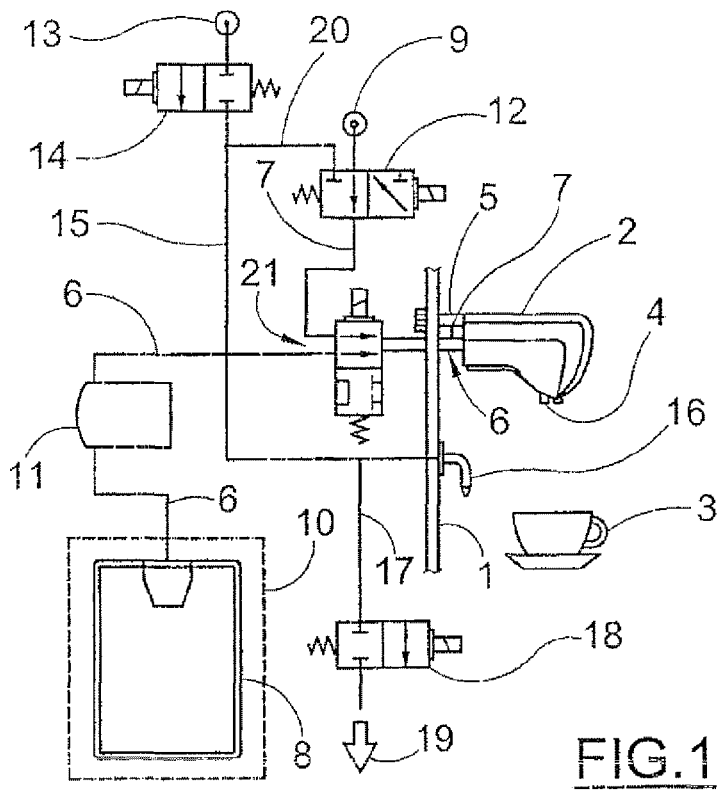
FIG. 1 shows, in schematic form, the apparatus according to the invention in its embodiment which is particularly suitable for machines with a fresh milk storage vessel, in the operating condition for delivery of the beverage.

With reference to the abovementioned figures and in particular to FIG. 1, 1 denotes schematically the front wall of a machine for preparing hot milk-based beverages, for example a professional machine for use in bars which is capable of producing and supplying "cappuccino". Alternatively, said wall may also form part of a machine for automatically dispensing similar beverages.

The wall 1 has, connected thereto, in a conventional manner, one or more delivery devices 2 which, also conventionally, when they are intended to supply milk-based beverages, comprise devices for frothing the milk as well as for heating it. These devices, being known per se, have not been shown in the drawings.

The prepared beverage passes from the delivery device 2 to an underlying cup 3 via one or more nozzles 4.

Again in a conventional manner, the delivery device 2 is connected to the wall 1 by means of a front coupling device—schematically indicated by 5—by means of which the hydraulic connections to the lines 6 and 7 are performed, said lines forming the connections to the milk source 8 and to the steam source 9, respectively.

As can be seen in FIG. 1, the source 8 is in the form of a storage vessel housed in a refrigerated environment 10 so that fresh milk may be used.

A pump 9 is arranged along the line 6, being operated conventionally by an associated electric motor. The pump 11 may be, for example, of the peristaltic type or gear type.

Along the steam supply line 7 the apparatus provides valve means 12 which open and close, upon emission of a command by the machine operating cycle, the steam supply to the delivery device 2.

In accordance with the invention, the apparatus comprises a source 13 of washing liquid, which may be for example tap water, intercepted by valve means 14 and connected, via a line 15, to a hydraulic coupling 16 mounted on the wall 1 of the machine and accessible from outside the latter as in the case of the delivery device 2.

The line 15 has, connected thereto, via a further line 17, valve means 18 communicating with a discharge outlet 19 for evacuating the liquid outside the machine.

The valve means 12, for reasons which will emerge more clearly from the continuation of the description, in addition to intercepting the supply of steam from the source 9, allow the line 7 to be connected to the line 15 via the line section 20.

The apparatus according to the invention includes, moreover, means for connecting the line 6, leading from the milk storage vessel 8, directly to the line 7 excluding the delivery device 2. These means, in accordance with a first embodiment thereof, consist of a valve 21 able to be operated and shown, in the drawings of FIG. 1 and FIG. 3, in the position where the connection to the delivery device 2 is active.

Figure 6:
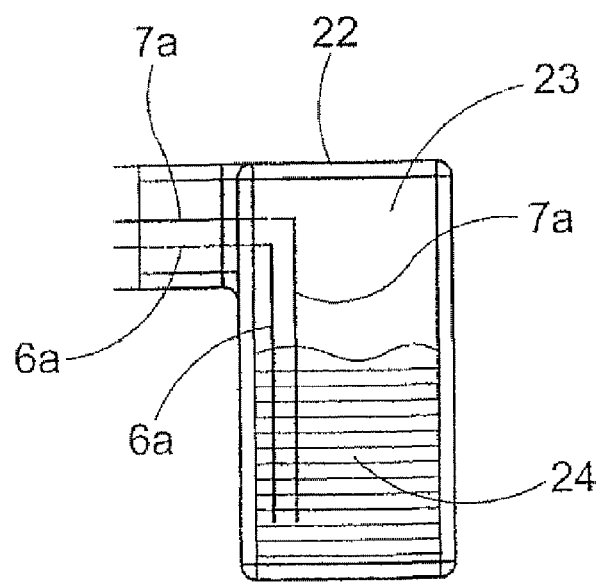
FIG. 6 shows a partially sectioned schematic view of a washing cartridge for the apparatus according to the invention.

In accordance with an alternative embodiment, the same means for connecting the line 6 directly to the line 7 consist of a box-shaped cartridge 22 with an internal cavity 23. The cartridge 22 is provided with ducts 6a and 7a which, by means of conventional coupling members, once the delivery device 2 is removed, may be connected to the lines 6 and 7 of the machine passing through the wall 1. The cartridge 22, which is shown in greater detail in FIG. 6, is also provided with a mechanical coupling 5a which, like the coupling 5 of the delivery device 2, performs the functions of mechanical connection to the wall 1.

The cavity 23 may contain a detergent substance or a disinfecting substance, or both, schematically indicated by 24.

The cartridge 22, in an economically advantageous embodiment, may be designed so as to have "disposable" characteristics and may contain one or more measured amounts of products for cleaning the circuits.

Figure 2:
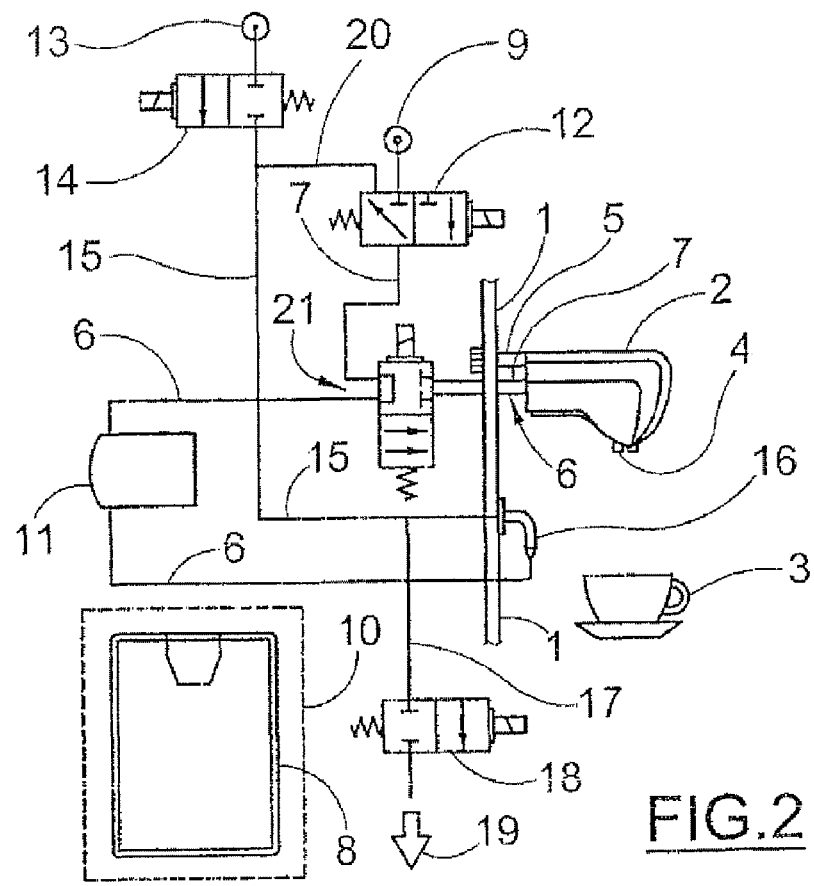
FIG. 2 shows the apparatus according to FIG. 1 in the condition for washing the circuits affected by the flow of milk according to a mode which allows the delivery device to be kept inserted.

From the description given above it can be understood that, during operation of the machine, in the embodiments according to FIGS. 1 and 2, the line 6 and at least part of the line 7 which extends inside the delivery device 2, are affected by the flow of heated milk which may also be frothed by the steam supplied by the source 9 via the line 7 and the valve 12

They therefore require periodic cleaning.

In accordance with the apparatus according to the invention and as shown in FIG. 2, this cleaning operation is performed by operating the valve 21 so that it is positioned to interrupt the connection to the delivery device 2 and provide a direct connection between the line 6 and the line 7 and also operating the valve 12 so that it is positioned to interrupt the supply of steam to the delivery device 2 and connect, via the line 20, the line 7 to the line 15. Moreover, the line 6 is displaced manually from the storage vessel 8 to the coupling 16 provided on the wall 1. Opening of the valve 14 causes supplying, in the circuit, of the washing liquid from the source 13. The valve means 18 and therefore the discharge outlet 19 are kept initially closed.

As can be seen from FIG. 2, with the valve means positioned as described above, a closed circuit is formed, said circuit comprising the path of the line 6 and the path of the line 7, which are connected by the lines 15 and 20, and including the pump 11. The washing liquid introduced by the valve 14, again set to the closed position, is circulated by the motor-driven pump 11 for a sufficient amount of time to remove from the walls of the lines any incrustations of milk formed during use of the machine. In the case of a motor-driven gear pump or peristaltic pump, circulation of the washing liquid may also advantageously be reversed.

Once this recirculation operation has been completed, the valve means 18 are opened and, again with the aid of the motor-driven pump 11, the washing liquid may be conveyed to the external discharge outlet 19.

Alternatively, during the discharge step, the washing operation may envisage again opening of the valve 14 with the introduction of further washing fluid into the circuit.

At the end of a predetermined time period, once the washing operation has been completed, the line 6 is disconnected from the coupling 16 and repositioned in the milk storage vessel 8 as shown in FIG. 1. At the same time, the valve means 21 are repositioned as shown in FIG. 1, the machine being set to perform its normal beverage delivery functions.

In the meantime the delivery device 2 could be left in the position engaged with the wall 1 of the machine or removed for conventional specific washing thereof, after disassembly of some or all of its component parts.

Figure 3:
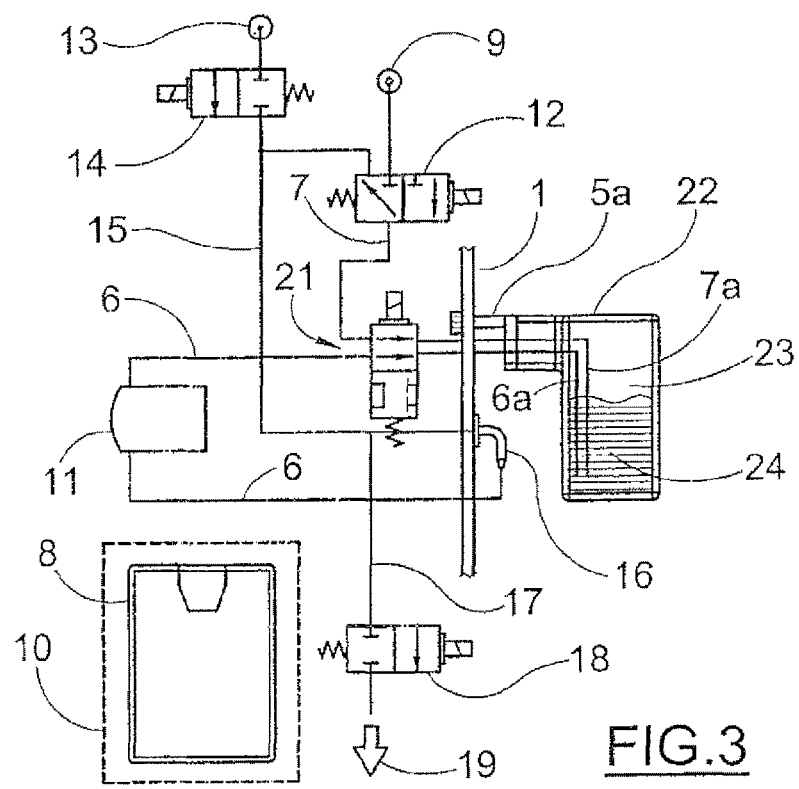
FIG. 3 shows the apparatus according to FIG. 1 in the condition for washing the circuits affected by the flow of milk with the delivery device replaced by a washing cartridge.

In the case of removal of the delivery device 2 and as an alternative to the function performed by the valve means 21 which may remain in the position shown in FIG. 3, a cartridge 22 containing a measured amount of detergent and/or disinfectant may be inserted instead of the delivery device 2.

Operation of the pump 11 forces the washing liquid, introduced into the circuit as described above, also inside the cavity 23, causing mixing with the substance 24 contained therein.

At the end of the recirculation inside the closed circuit, opening of the valve means 18 allows discharging of the liquid and any washing with free outflow as described above.

Figure 4:
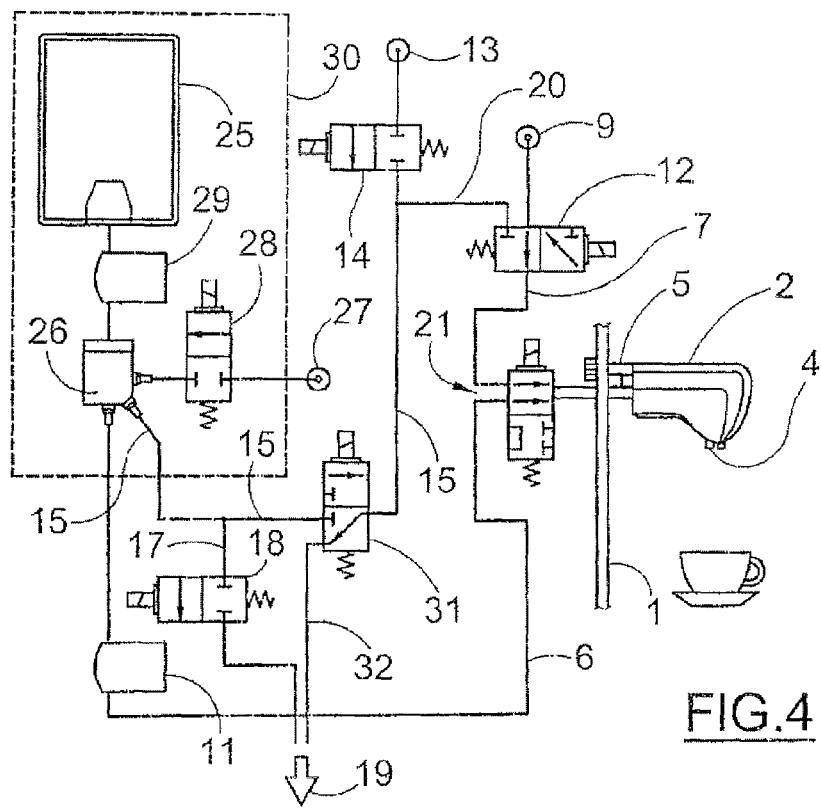
FIG. 4 shows, in schematic form, the apparatus according to the invention in its embodiment which is particularly suitable for machines with an apparatus for producing milk by means of dilution of condensed milk with water, in the operating condition for delivery of the beverage.
Figure 5:
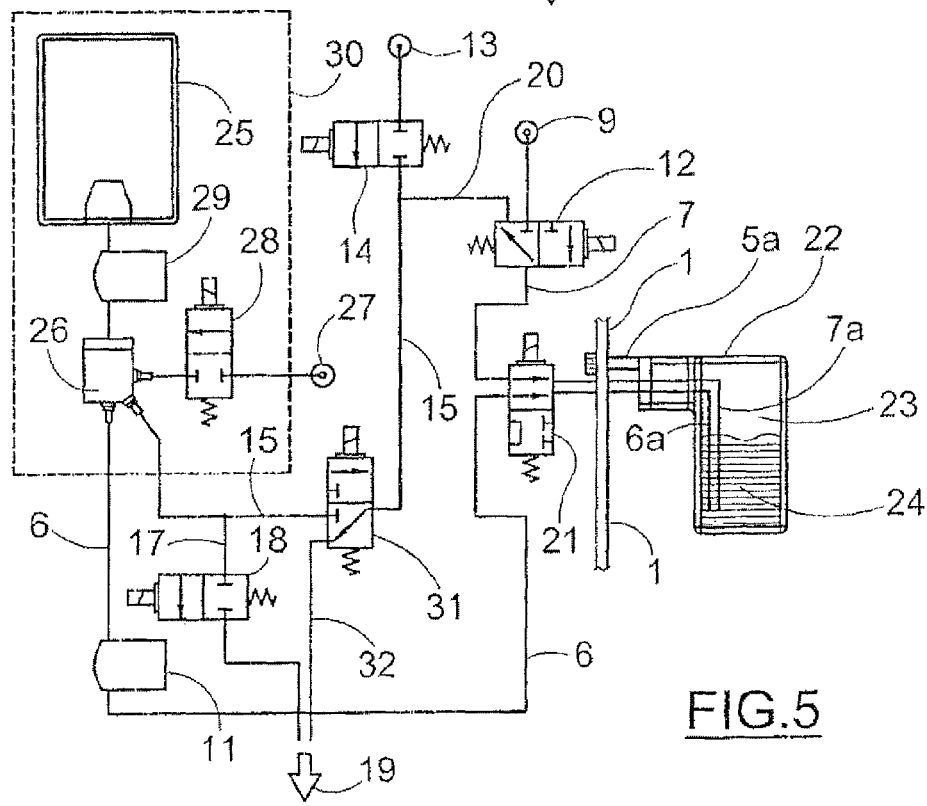
FIG. 5 shows the apparatus according to FIG. 4 in the condition for washing the circuits affected by the flow of milk with the delivery device replaced by a washing cartridge.

With reference now to FIGS. 4 and 5 it can be seen that the washing apparatus has a constructional design which is particularly suitable for machines in which the milk is obtained by means of dilution of condensed milk with water, both the water and a measured amount of condensed milk being supplied to a mixing and dilution device.

With reference to the abovementioned FIGS. 4 and 5, where the parts corresponding to those described in the previous FIGS. 1 and 2 have been indicated by the same reference numbers, the condensed milk storage vessel has been indicated by 25, while the mixing and dilution device has been indicated by 26. The dilution water is supplied by a special source 27 intercepted by valve means 28. The condensed milk is drawn from the storage vessel 25 and conveyed to the mixing device 26 via a pump 29 which may also be, for example, of the peristaltic type or gear type. The set of devices 25, 26, 28 and 29, denoted overall by 30, therefore constitutes the milk source equivalent, in practice, to the storage vessel 8 of the embodiment shown in FIGS. 1 and 2.

The apparatus in the embodiment according to FIGS. 4 and 5 also comprises valve means 31 situated on the line 15 from the washing liquid source. These valve means 31, in a first position thereof such as that shown in FIGS. 4 and 5, connect the line 15 directly to the discharge outlet 19, while, in a second position thereof, they connect the same line 15 to the device 26 inside which dilution of the condensed milk occurs.

The line washing operations also in the embodiment according to FIG. 4 are performed in a manner identical to that described in relation to the first embodiment of FIG. 1.

According to a first alternative, leaving for example the delivery device 2 inserted in the machine, the hydraulic path 6 from the condensed-milk dilution device is connected directly to the path from the steam source 9 by switching the valve means 21. Closing of the circuit is performed by switching the valve means 12 which connect the line 7 to the line 15 via the line 20.

Assuming the valve means 31 to be in the position where the line 15 is connected to the device 26, with the introduction into the line 15 of a certain quantity of washing liquid, by means of the intercept valve 14 and operation of the pump 11, recirculation washing is obtained in the entire circuit. At the end of this washing step, opening of the valve means 18 and, if necessary, also switching of the valve means 31 allows the washing liquid to be discharged.

Alternatively, with reference to FIG. 5, instead of operating the valve means 21, the delivery device 2 may be disconnected and a cartridge 22 inserted in its place so as to establish a direct connection between the line 6 and the line 7, passing via the cavity 23 containing the detergent and/or disinfectant.

After supplying into the line 15, via the valve 14, a given quantity of washing liquid which, in this alternative embodiment, could also be solely water in that the detergent and/or disinfectant is already contained inside the cartridge 22, the cleaning operations are then performed using the same procedures described above.

It is understood that constructional variants, in addition to those described and illustrated, may be implemented by a person skilled in the art without thereby departing from the scope of the present invention as claimed below.

What is claimed is:

1. An apparatus for washing hydraulic circuits involved in the preparation of milk-based beverages in machines for automatically dispensing hot drinks and/or in machines for preparing and supplying espresso coffee provided with a beverage delivery device, a milk source and a steam source, said circuits comprising at least one first hydraulic path which extends between the milk source and the delivery device, at least one second hydraulic path which extends between the steam source and the same delivery device, a motor-driven pump arranged along said first hydraulic path, intercept valve means located along said second hydraulic path, a source of washing liquid, a line between said source of washing liquid and a point located along the said first hydraulic path as well as valve means for intercepting said line, means for connecting the said first hydraulic path to the said second hydraulic path, valve means for connecting the said second hydraulic path to the said line located between said source of washing liquid and said point located along the first path and valve means for connecting the resultant hydraulic circuit to a discharge outlet.

2. An apparatus according to claim 1, wherein said means for connecting said first hydraulic path to said second hydraulic path comprise valve means.

3. An apparatus according to claim 1, wherein said means for connecting said first hydraulic path to said second hydraulic path comprise a cartridge having a closed internal cavity provided with first means for connection to the said first hydraulic path as well as second means for connection to said second hydraulic path.

4. An apparatus according to claim 3, wherein said cartridge is provided with coupling members for connection to the machine.

5. An apparatus according to claim 4, wherein said coupling members coincide with the coupling members for connecting the beverage delivery device to the machine.

6. An apparatus according to claims 3, wherein said cartridge includes a cavity containing a measured amount of detergent and/or disinfectant substance.

7. An apparatus according to claim 6, wherein said cartridge is of the disposable type.

* * * * *